(12) United States Patent
Lei

(10) Patent No.: US 12,538,164 B2
(45) Date of Patent: Jan. 27, 2026

(54) DATA TRANSMISSION METHOD, RELATED DEVICE, COMPUTER READABLE STORAGE MEDIUM, AND COMPUTER PROGRAM PRODUCT

(71) Applicant: Tencent Technology (Shenzhen) Company Limited, Guangdong (CN)

(72) Inventor: Yixue Lei, Shenzhen (CN)

(73) Assignee: Tencent Technology (Shenzhen) Company Limited, Shenzhen (CN)

(*) Notice: Subject to any disclaimer, the term of this patent is extended or adjusted under 35 U.S.C. 154(b) by 327 days.

(21) Appl. No.: 18/209,601

(22) Filed: Jun. 14, 2023

(65) Prior Publication Data
US 2023/0345295 A1    Oct. 26, 2023

Related U.S. Application Data

(63) Continuation of application No. PCT/CN2022/132029, filed on Nov. 15, 2022.

(30) Foreign Application Priority Data

Jan. 10, 2022 (CN) .......................... 202210023805.2

(51) Int. Cl.
*H04W 12/00* (2021.01)
*G06T 11/00* (2006.01)
*H04L 41/147* (2022.01)
*H04W 28/02* (2009.01)
*H04W 28/12* (2009.01)

(52) U.S. Cl.
CPC ......... *H04W 28/0268* (2013.01); *G06T 11/00* (2013.01); *H04L 41/147* (2013.01); *H04W 28/12* (2013.01)

(58) Field of Classification Search
CPC . H04W 28/0268; H04W 28/12; H04W 72/04; G06T 11/00; H04L 41/147; H04L 1/00; H04L 43/0894; H04L 1/0002
See application file for complete search history.

(56) References Cited

U.S. PATENT DOCUMENTS

| | | | |
|---|---|---|---|
| 2020/0374743 A1* | 11/2020 | Xin | H04W 4/00 |
| 2021/0133670 A1* | 5/2021 | Cella | G06N 3/044 |
| 2021/0149380 A1* | 5/2021 | Rakshit | G05B 19/41875 |
| 2024/0414558 A1* | 12/2024 | Haustein | H04L 41/145 |

* cited by examiner

Primary Examiner — Lakeram Jangbahadur
(74) Attorney, Agent, or Firm — ArentFox Schiff LLP

(57) ABSTRACT

In a method for data transmission, a first information transmission rate is determined according to a first quality of service requirement of a wireless network. The first quality of service requirement is determined according to a first network state of the wireless network. Acquired first attribute information of a physical object is transmitted to a digital twinning application terminal over the wireless network using the first information transmission rate. A digital twin of the physical object is constructed or updated based on the first attribute information of the physical object.

20 Claims, 8 Drawing Sheets

DATA TRANSMISSION METHOD, RELATED DEVICE, COMPUTER READABLE STORAGE MEDIUM, AND COMPUTER PROGRAM PRODUCT

RELATED APPLICATIONS

The present application is a continuation of International Application No. PCT/CN2022/132029 filed on Nov. 15, 2022, which claims priority to Chinese Patent Application No. 202210023805.2, filed on Jan. 10, 2022. The entire disclosures of the prior applications are hereby incorporated by reference.

FIELD OF THE TECHNOLOGY

This disclosure relates to the field of communication technologies, including to a data transmission method, a related device, a computer readable storage medium, and a computer program product.

BACKGROUND OF THE DISCLOSURE

Digital twin is a simulation process making full use of data such as physical models, sensor updates, and operating history and integrating multiple disciplines, multiple physical quantities, multiple scales, and multiple probabilities. The digital twin mainly relates to constructing an identical entity in a digital world by digitally simulating events (objects, targets, etc.) in the physical world, so as to implement the process of understanding, analyzing and optimizing a physical entity. In a product design phase, the use of digital twin can improve the accuracy of design, and verify the performance of a product in a real environment.

In the solutions provided by related technologies, due to the lack of real-time interaction, digital twin systems cannot be used for real-time traffic applications such as safety warnings.

SUMMARY

Embodiments of this disclosure provide a data transmission method, a digital twinning application terminal, a terminal, a communication device, a non-transitory computer-readable storage medium, and a computer program product. In an example, the digital twinning application terminal can adaptively adjust, according to a network state of a wireless network, an information transmission rate at which the terminal transmits attribute information of a physical entity to the wireless network.

The embodiments of this disclosure provide a method for data transmission. The method may be executed by a digital twinning application terminal, for example. In the method for data transmission, a network state notification message of a wireless network is received from a first core network element of the wireless network. The network state notification message indicates that the wireless network is in a first network state. A first quality of service requirement of the wireless network is determined according to the first network state indicated by the network state notification message. First attribute information of a physical object acquired by a terminal is received at a first information transmission rate over the wireless network. The first information transmission rate is based on the first quality of service requirement. A digital twin of the physical object is constructed or updated according to the first attribute information of the physical object received at the first information transmission rate.

The embodiments of this disclosure provide a method for data transmission. The method may be executed by a terminal, for example. In the method for data transmission, a first information transmission rate is determined according to a first quality of service requirement of a wireless network. The first quality of service requirement is determined according to a first network state of the wireless network. Acquired first attribute information of a physical object is transmitted to a digital twinning application terminal over the wireless network using the first information transmission rate. A digital twin of the physical object is constructed or updated based on the first attribute information of the physical object.

The embodiments of this disclosure provide an information processing apparatus. The information processing apparatus includes a digital twinning application terminal, for example. The information processing apparatus includes processing circuitry that is configured to receive a network state notification message of a wireless network from a first core network element of the wireless network. The network state notification message indicates that the wireless network is in a first network state. The processing circuitry is configured to determine a first quality of service requirement of the wireless network according to the first network state indicated by the network state notification message. The processing circuitry is configured to receive, at a first information transmission rate over the wireless network, first attribute information of a physical object acquired by a terminal. The first information transmission rate is based on the first quality of service requirement. The processing circuitry is further configured to construct or update a digital twin of the physical object according to the first attribute information of the physical object received at the first information transmission rate.

The embodiments of this disclosure provide an information processing apparatus. The information processing apparatus includes a terminal, for example. The information processing apparatus includes processing circuitry that is configured to determine a first information transmission rate according to a first quality of service requirement of a wireless network. The first quality of service requirement is determined according to a first network state of the wireless network. The processing circuitry is configured to transmit acquired first attribute information of a physical object to a digital twinning application terminal over the wireless network using the first information transmission rate. A digital twin of the physical object is constructed or updated based on the first attribute information of the physical object.

The embodiments of this disclosure provide a non-transitory computer readable storage medium, storing instructions which when executed by a processor cause the processor to perform any of the methods for data transmission.

The embodiments of this disclosure provide a communication device, including: one or more processors; and a memory, configured to store one or more programs, the one or more programs, when executed by the one or more processors, causing the communication device to implement any of the methods for data transmission.

The embodiments of this disclosure further provide a computer program product, including a computer program, the computer program, when executed by a processor, implementing any of the methods for data transmission.

For example, through the solutions provided by the embodiments of this disclosure, a digital twin is constructed or a created digital twin is updated according to attribute information of a physical entity matched with a network state of a wireless network, so that the digital twin adaptively adapts to the network state of the wireless network, thereby ensuring real-time transmission of data. In this way, real-time traffic applications such as safety warnings can be supported.

DESCRIPTION OF EMBODIMENTS

Exemplary implementations will now be described in more detail with reference to the accompanying drawings. However, the examples of implementations may be implemented in multiple forms, and is the examples are not to be understood as being limited to the examples described herein. Other implementations are within the scope of the present disclosure.

The technical solutions of embodiments of this disclosure may be applied in various communication systems, such as: 4G, 5G, and 5G evolved systems.

Figure 1:
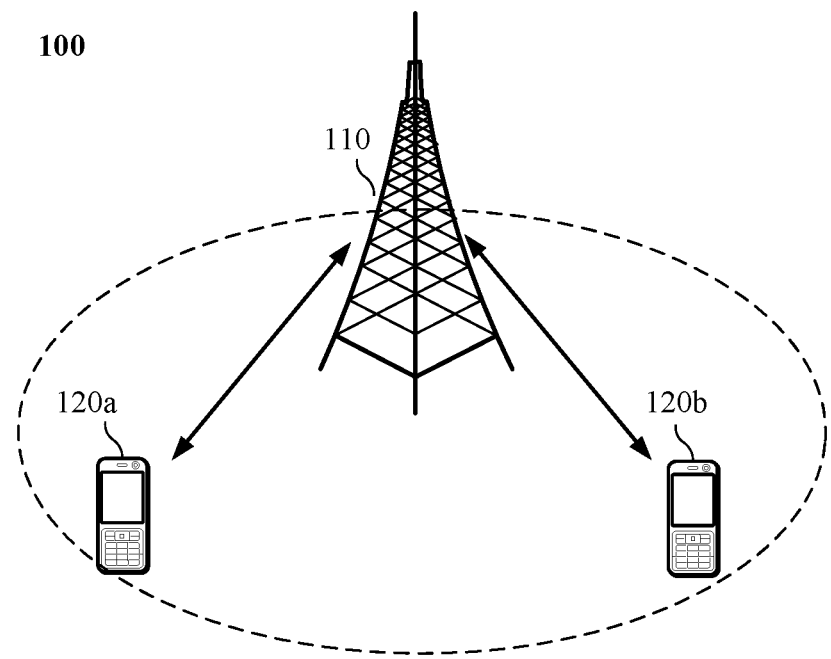
FIG. 1 is a schematic diagram of a communication system architecture according to an embodiment of this disclosure.

For example, a communication system 100 applied in the embodiments of this disclosure is as shown in FIG. 1. The communication system 100 may include a network device 110, and the network device 110 may be a device communicating with terminals 120 (or called communication terminals or terminals, such as terminals 120a and 120b). The network device 110 may provide a communication coverage for a specific geographical area, and may communicate with a terminal located within the coverage.

The communication system 100 may further include at least one terminal 120 located within the coverage of the network device 110. The term "terminal" used herein includes but is not limited to an apparatus configured to receive/transmit a communication signal via a wired line connection, and/or via another data connection/network, and/or via a wireless interface, and/or via another terminal; and/or an Internet of Things (IoT) device. The terminal may be an access terminal, a user equipment (UE), a user unit, a user station, a mobile station, a mobile platform, a remote station, a remote terminal, a mobile device, a user terminal, a terminal, a wireless communication device, a user agent, a user apparatus.

In some embodiments, a 5G system or 5G network may also be called a new radio (NR) system or an NR network.

FIG. 1 exemplarily shows one network device and two terminals. In some embodiments, the communication system 100 may include a plurality of network devices, and other numbers of terminals may be included within the coverage of each network device. This is not limited in the embodiments of this disclosure.

In some embodiments, the communication system 100 may also include a network controller, a mobility management entity, and other network entities. This is not limited in the embodiments of this disclosure.

Devices having communication functions in the network/ system in the embodiments of this disclosure may be called as communication devices. Taking the communication system 100 shown in FIG. 1 as an example, communication devices include the network device 110 and the terminals 120 having communication functions, and the network device 110 and the terminals 120 may be specific devices described above. Details are not described herein again. The communication devices may further include other devices in the communication system 100, such as a network controller, a mobility management entity, and other network entities. This is not limited in the embodiments of this disclosure.

The terms "system" and "network" in this disclosure may be generally used interchangeably. The term "and/or" in this disclosure only describes association relationships between associated objects, and represents that three relationships may exist. For example, A and/or B may represent: only A exists, both A and B exist, and only B exists.

Figure 2:
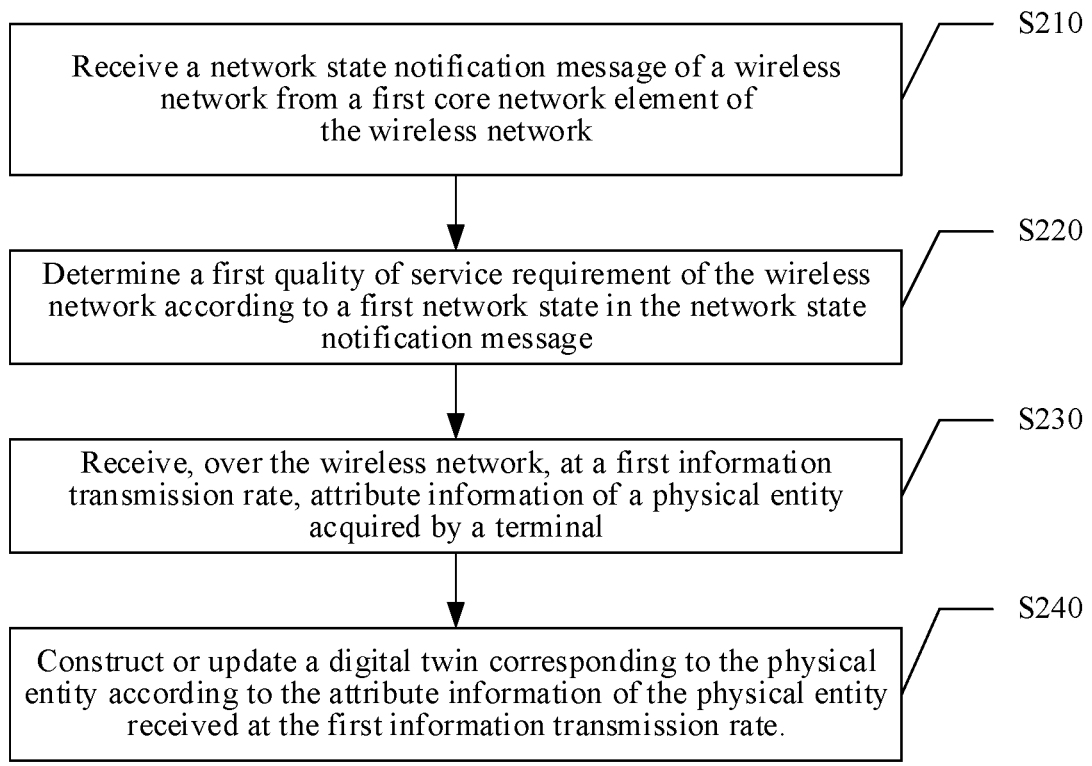
FIG. 2 exemplarily shows a flowchart of a data transmission method according to an embodiment of this disclosure.

A method provided in the embodiment of FIG. 2 can be executed by a digital twinning application terminal. In the embodiment of this disclosure, the digital twinning application terminal may include any electronic device installed with a digital twinning application, such as a terminal and/or a server. The server herein may be an application server. The digital twinning application terminal may interact with the wireless network through a network elements such as an application function (AF) network element, receive, over the wireless network, attribute information of a physical entity in the physical world acquired by the terminal, and map the attribute information into a digital twin of a corresponding digital world, where the attribute information can be displayed by the digital twinning application.

As shown in FIG. 2, the method provided in this embodiment of this disclosure may include the following steps:

In step S210, a network state notification message of a wireless network is received from a first core network element of the wireless network.

The network state notification message indicates that the wireless network is in a first network state.

In the embodiments of this disclosure, the first core network element may be a network data analytics function (NWDAF) network element; however, this is not limited thereto in this disclosure. The first core network element may be any network element having a statistical analysis and/or predictive analysis function in a core network device. In the following embodiments, the NWDAF network element is taken as an example for description.

In the embodiments of this disclosure, the NWDAF network element may predictively analyze a network state of the wireless network in real time. The network state of the wireless network can reflect a resource condition of the wireless network, such as whether a bandwidth is insufficient. The NWDAF network element may feed back the network state of the wireless network predictively analyzed in real time to a digital twinning application terminal through an AF network element.

As an example, the types of network state may be diversified. For example, the types of network state may be classified to two types: a sufficient bandwidth and an insufficient bandwidth, where the insufficient bandwidth may be further classified to three types: a slightly insufficient network bandwidth, a comparatively insufficient network bandwidth, and a severely insufficient network bandwidth.

Different types of network state may be identified by setting value spaces of available network bandwidths (that is, currently available idle network bandwidths of the wireless network). For example, taking the unit of the network bandwidth being megabits per second (Mbps) as an example, a value space corresponding to the sufficient network bandwidth may be set as [1000, 2000], a value space corresponding to the insufficient network bandwidth may be set as [0, 999], a value space corresponding to the severely insufficient network bandwidth may be set as [0, 333], a value space corresponding to the comparatively insufficient network bandwidth may be set as [334, 666], and a value space corresponding to the slightly insufficient network bandwidth may be set as [667, 999].

Said classification of types of network bandwidth is implemented at the dimension of the available network bandwidth. As an alternative, types of network bandwidth may be classified at the dimension of an average available network bandwidth of an accessed wireless network, where the average available network bandwidth is a ratio of the available network bandwidth of the wireless network to the number of currently accessed digital twinning application terminals. Distinguishing the network states of the wireless network from the perspective of the network bandwidth that can be used by the digital twinning application terminal can more accurately reflect the change in the carrying capacity of the wireless network for communication of the digital twinning application terminal.

In an exemplary embodiment, the network state notification message may indicate that the wireless network changes from a second network state to the first network state. Before the receiving a network state notification message of a wireless network from a first core network element of the wireless network, the method may further include: determining a second quality of service requirement of the wireless network according to the second network state; receiving, over the wireless network in the second network state, at a second information transmission rate, attribute information of the physical entity acquired by the terminal, the second information transmission rate being matched with the second quality of service requirement; and constructing or updating a digital twin corresponding to the physical entity according to the attribute information of the physical entity received at the second information transmission rate.

In the embodiment of this disclosure, assuming that at initial, the wireless network is in the second network state, for example, in a sufficient bandwidth state, the AF network element may generate a second quality of service (QoS) requirement according to the second network state. The second QoS requirement is adapted to the second network state, and the second QoS requirement may include bandwidth, time delay, jitter, and other requirements corresponding to the second network state. A terminal responsible for acquiring a physical entity in the physical world may adaptively transmit, according to the second QoS requirement, at a second information transmission rate matched with the second QoS requirement, attribute information of the physical entity in the physical world acquired by the AF network element, so as to implement real-time transmission of the attribute information of the physical entity in the physical world acquired by the terminal to the digital twinning application terminal, thereby achieving real-time mapping of the physical entity in the physical world to a corresponding digital twin in a digital world. Therefore, the digital twinning application in the embodiment of this disclosure may also be called as a real-time digital twinning application.

When the NWDAF network element detects, by predictively analyzing the network state of the wireless network, that the wireless network changes from the second network state to the first network state, for example, changes from a sufficient bandwidth state to an insufficient bandwidth state, the NWDAF network element may transmit the network state notification message to the AF network element, to notify the AF network element that the network state of the wireless network is changed at this time. The AF network element may generate a first QoS requirement according to the first network state. The first QoS requirement is adapted to the first network state, and the first QoS requirement may include bandwidth, delay, jitter, and other requirements corresponding to the first network state. A terminal responsible for acquiring a physical entity in the physical world may adaptively transmit, according to the first QoS request, at a first information transmission rate matched with the first QoS request, attribute information of the physical entity in the physical world acquired by the terminal, so as to implement real-time transmission of the attribute information of the physical entity in the physical world acquired by the terminal to the digital twinning application terminal, thereby achieving real-time mapping of the physical entity in the physical world to a corresponding digital twin in a digital world. That is, the real-time digital twinning application provided by the embodiment of this disclosure adaptively changes, according to the change in the network state of the wireless network, the information transmission rate at which the terminal transmits the acquired attribute information of the physical entity in the physical world.

In some embodiments, before receiving a network state notification message of a wireless network from a first core network element of the wireless network, the digital twinning application terminal may not receive, at the second information transmission rate, the attribute information of the physical entity acquired by the terminal. That is, the first information transmission rate is determined according to a first quality of service requirement instead of the second information transmission rate.

In some embodiments, the terminal may include but is not limited to: a smart phone, a tablet computer, an e-reader, a moving picture experts group audio layer III (MP3) player, a moving picture experts group audio layer IV (MP4) player, a laptop portable computer, an on-board computer, a desktop computer, a set top box, a smart TV, a wearable device, various sensors in the Internet of Things, and the like. Specific terminals are not limited in the embodiment of this disclosure.

In an exemplary embodiment, the method may further include: transmitting a network state prediction service subscription request message to the first core network element; and receiving a network state prediction service subscription response message returned by the first core network element.

In the embodiment of this disclosure, the digital twinning application terminal may transmit a network state prediction service subscription request message to the NWDAF network element through the AF network element to request the NWDAF network element to predictively analyze the network state of the wireless network, and transmit the network state notification message to the AF network element when the network state of the wireless network changes upon predictive analysis. The network state prediction service subscription request message may carry information on the AF network element and/or information on the digital twinning application terminal, such as an AF identity (ID) and/or an ID of the digital twinning application terminal. After receiving the network state prediction service subscription request message, the NWDAF network element may perform authentication according to the information on the AF network element and/or the information on the digital twinning application terminal carried in the network state prediction service subscription request message; if the authentication is passed, the NWDAF network element may return to the AF network element a network state prediction service subscription response message indicating that subscription succeeds; and if the authentication is not passed, the NWDAF network element may return to the AF network element a network state prediction service subscription response message indicating that subscription fails. It is assumed here that the AF network element receives the network state prediction service subscription response message indicating that subscription succeeds, that is, the NWDAF network element predictively analyzes the network state of the wireless network, and transmits the network state notification message to the AF network element when the network state of the wireless network changes upon predictive analysis. On the contrary, if the AF network element receives the network state prediction service subscription response message indicating that subscription fails, then the NWDAF network element ends this operation.

In step S220, a first quality of service requirement of the wireless network is determined according to the first network state in the network state notification message.

In an exemplary embodiment, the second information transmission rate may be determined according to a second representation manner (or type), a second representation information quantity, a second representation information frequency, etc., used by the attribute information. The determining a first quality of service requirement of the wireless network according to the first network state in the network state notification message may include: adjusting at least one of bandwidth, time delay, jitter, etc. in the second quality of service requirement according to the first network state, to obtain the first quality of service requirement. The first quality of service requirement may be used for adjusting at least one of the second representation manner, the second representation information quantity, and the second representation information frequency, so as to obtain at least one of a first representation manner (or type), a first representation information quantity, and a first representation information frequency. The first representation manner, the first representation information quantity, and the first representation information frequency may be used for determining the first information transmission rate.

For example, the terminal may be configured to determine at least one of the first representation manner, the first representation information quantity, and the first representation information frequency by adjusting at least one of the second representation manner, the second representation information quantity, and the second representation information frequency according to the first quality of service requirement, and determine the first information transmission rate according to at least one of the first representation manner, the first representation information quantity, and the first representation information frequency.

In the embodiment of this disclosure, the representation manner indicates which manner is used to represent the attribute information of the physical entity in the physical world acquired by the terminal. It is assumed that at initial, the second representation manner is used to represent the attribute information of the physical entity in the physical world acquired by the terminal. The representation information quantity indicates, in a case that which representation manner is used to represent the attribute information of the physical entity in the physical world acquired by the terminal, which information quantity is used to represent the attribute information of the physical entity in the physical world represented by this representation manner. It is assumed that at initial, the second representation information quantity is used to represent the attribute information of the physical entity in the physical world represented by the second representation manner. The representation information frequency indicates a frequency (e.g., frequency or number of times) at which the terminal transmits the attribute information of the physical entity in the physical world to the wireless network. It is assumed that at initial, the second representation information frequency is used to transmit the attribute information of the physical entity in the physical world. The second information transmission rate may be determined according to the second representation manner, the second representation information quantity, and the second representation information frequency. Therefore, when the wireless network changes from the second network state to the first network state, the second information transmission rate may be adjusted to the first information transmission rate by adjusting any one or more of the second representation manner, the second representation information quantity, and the second representation information frequency, so as to match the first QoS requirement after the change.

In the embodiment of this disclosure, the second representation manner may be the same as the first representation manner or may be different from the first representation manner, the second representation information quantity may be the same as the first representation information quantity or may be different from the first representation information quantity, and the second representation information frequency may be the same as the first representation information frequency or may be different from the first representation information frequency, which depends on which of the second representation manner, the second representation information quantity, and the second representation information frequency is adjusted.

In step S230, at a first information transmission rate, attribute information of a physical entity acquired by a terminal is received over a wireless network, the first information transmission rate being matched with the first quality of service requirement.

For example, when the bandwidth in the first QoS requirement is reduced, the first information transmission rate is adaptively reduced, so that the first information transmission rate is adapted to the bandwidth in the first QoS requirement.

As an example of the adaption, the first information transmission rate may remain a fixed ratio of the bandwidth in the first QoS requirement.

The physical entity may be any object to be monitored in the physical world. For example, the application fields corresponding the physical entity may include: satellite/space communication network, ship, vehicle, power plant, aircraft, mechanical and electrical equipment, warehouse, medical treatment, manufacturing workshop, smart city, intelligent traffic, etc. For example, the physical entity corresponding to the field of intelligent traffic may include: traffic light, road, vehicle, pedestrian, etc.

In step S240, a digital twin corresponding to the physical entity is constructed or updated according to the attribute information of the physical entity received at the first information transmission rate.

The attribute information of the physical entity may be any information used for describing the physical entity, and the attribute information varies with different application fields and physical entities. This is not limited in the embodiment of this disclosure. A digital twinning application may determine a digital twin corresponding to the physical entity according to the attribute information.

In the embodiment of this disclosure, the digital twin corresponding to the physical entity may be constructed in advance in the digital world, and the digital twinning application terminal may dynamically update or correct the pre-construct digital twin according to the attribute information of the physical entity received in real time. In other embodiments, the digital twinning application terminal may construct a corresponding digital twin according to the attribute information of the physical entity received in real time.

In the data transmission method according to the embodiment of this disclosure, the digital twinning application terminal may adaptively change the method of the digital twinning application according to the network state of the wireless network, such as a resource condition of the wireless network. For example, the information transmission rate of the attribute information of the physical entity in the physical world acquired by the terminal may be automatically adjusted to adapt to the current first network state of the wireless network, so that the digital twinning application may acquire the attribute information of the physical entity in real time. That is, the real-time digital twinning application can be applied to some real-time traffic application scenarios that need to safety warnings.

The following are examples of applying the solutions provided in the embodiments of this disclosure to real-time traffic application scenarios. However, the solutions provided in this disclosure can be applied to any scenario where the digital twin is used to monitor the physical entity in real time. This is not limited in the embodiments of this disclosure.

An intelligent traffic system (ITS) is also called an intelligent transportation system, in which advanced science and technology (information technology, computer technology, data communication technology, sensor technology, electronic control technology, automatic control theory, operational research, artificial intelligence, etc.) are effectively and comprehensively applied in transportation, service control and vehicle manufacturing, thereby strengthening the relationships among vehicles, roads, and users, and forming a comprehensive transportation system that guarantees safety, improves efficiency, improves the environment, and saves energy.

An intelligent vehicle infrastructure cooperative system (IVICS), referred to as a vehicle infrastructure cooperative system, is a development direction of the intelligent traffic system (ITS). The vehicle infrastructure cooperative system uses advanced wireless communication and new-generation Internet technologies to comprehensively implement vehicle-vehicle and vehicle-road dynamic real-time information interaction, and performs vehicle active safety control and road collaborative management on the basis of full-time and spatial dynamic traffic information collection and fusion to fully implement effective coordination of people, vehicles and roads, ensuring traffic safety, improving traffic efficiency, and then forming a safe, efficient and environmentally friendly road traffic system.

Figure 3:
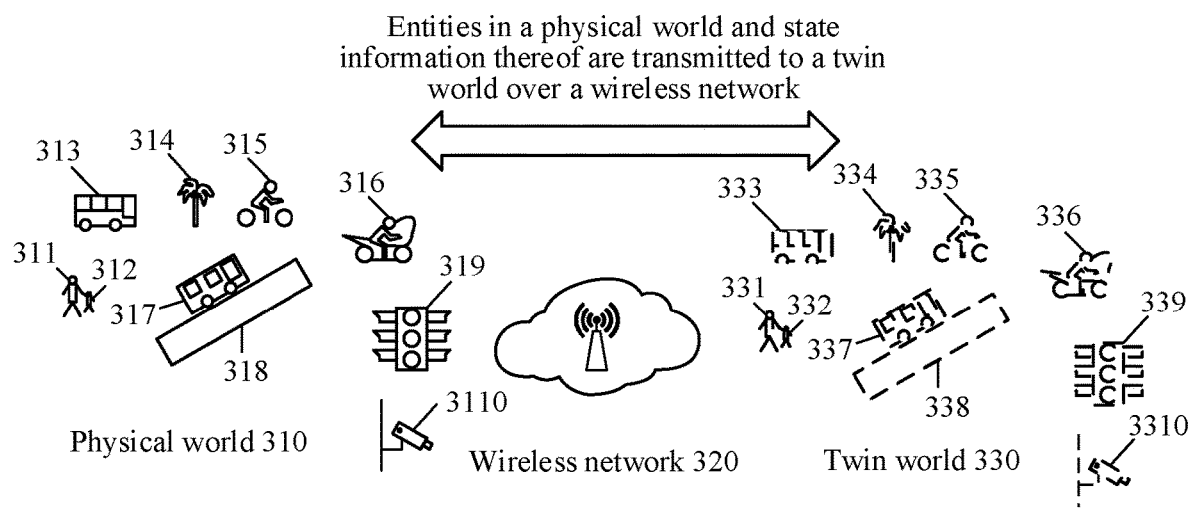
FIG. 3 exemplarily shows a schematic diagram of an application scenario of a data transmission method according to an embodiment of this disclosure.

The schematic diagram of the real-time digital twin in the traffic scenario is shown in FIG. 3.

As shown in FIG. 3, targets (i.e., physical entities) including pedestrians (311, 312), vehicles (313, 317), a road 318, a tree 314, a cyclist 315, a motorcyclist 316, a traffic light 319, and a camera 3110 in a physical world 310 can be digitized and then form, over a wireless network 320 (the wireless network 320 can be used for a movable target such as the pedestrian, but this is not limited thereto) or a wired network (the wired network can be used for a fixed target such as the traffic light and the camera, but this is not limited thereto), corresponding digital twins with objects in a twin digital world (a twin world 330), such as digital twins (331, 332) corresponding to the pedestrians (311, 312), digital twins (333, 337) corresponding to the vehicles (313, 317), a digital twin 338 corresponding to the road 318, a digital twin 334 corresponding to the tree 314, a digital twin 335 corresponding to the cyclist 315, a digital twin 336 corresponding to the motorcyclist 316, a digital twin 339 corresponding to the traffic light 319, and a digital twin 3310 corresponding to the camera 3110.

In the embodiment of FIG. 3, an Internet of Things terminal may be used as a terminal for acquiring attribute information of the physical entities in the physical world 310, and the Internet of Things terminal may perform data interaction with the digital twinning application terminal over the wired network or the wireless network 320.

The Internet of Things terminal may be used for acquiring the attribute information corresponding to the physical entities (also referred to as entities) and report the attribute information to the digital twinning application terminal. Taking the physical entity being a vehicle as an example, the attribute information corresponding thereto may include: position, velocity, etc. Specific attribute information is not limited in the embodiment of this disclosure.

In an embodiment of this disclosure, the Internet of Things terminal may further include: an Internet of Things module. The Internet of Things module may include: a data transfer unit (DTU), an edge gateway, or a communication module, etc. The communication module may include: a Bluetooth, a WiFi module, or a long range radio (LoRa) module, etc.

The DTU is a wireless terminal device specially used for converting serial port data into Internet protocol (IP) data or converting IP data into serial port data, and transmitting data over a wireless communication network.

The digital twin maintains real-time or frequent data synchronization with the vehicle. That is, the vehicle regularly notifies the digital twin of attribute information/state information such as position, velocity, driving behavior information, etc., and the digital twin learns the attribute information of the vehicle such as moving position, velocity, driving behavior information, etc.

For example, the Internet of Things terminal may be an on-board terminal on a vehicle. The on-board terminal can sense the environment around the vehicle and road conditions through various sensors, and transmit the sensed attribute information to the digital twinning application terminal in real time through an on-board communication device or an on-board mobile phone device over a wireless network, such as a cellular network, roadside WiFi, etc. The digital twinning application terminal creates a corresponding digital twin for the vehicle according to the received attribute information. The sensors may include: a millimeter wave radar, a laser radar, an ultrasonic radar, a camera, a global navigation satellite system (GNSS), an inertial sensor, etc.

Both an information quantity required to portray and describe each target in the physical world and the frequency at which the information quantities are synchronized to the digital twins in the digital world may affect the information quantities transmitted over the wireless network. For the wireless network, bandwidth resources are needed.

Taking a 5G network as an example, when it is assumed that there are N (N is a positive integer greater than or equal to 1) targets requiring real-time digital twinning in a 5G cell, the i-th target is represented as Oi (i is an integer greater than or equal to 1 and less than or equal to N), there are Mi parameters of the i-th target, Mi is an integer greater than or equal to 1, the byte quantity required for representation of the j-th parameter of the i-th target is $K_j^i$, j is an integer greater than or equal to 1 and less than or equal to Mi, and an information update frequency of the j-th parameter of the i-th target is $F_j^i$, a rate V(t) generated per second may be expressed as:

$$V(t) = \sum_{i=1}^{N} \sum_{j=1}^{M_i} K_j^i F_j^i \quad (1)$$

The rate generated per second may be also called as an information transmission rate, and may be the first information transmission rate or the second information transmission rate. An actual information transmission rate may be calculated by using another calculation formula, such as integration. This is not limited in the embodiments of this disclosure.

Because the capacity of a core network can fully meet the highest rate of an air interface, the capacity of the air interface cannot meet a peak demand of the V(t) function, such that the network cannot support real-time reproduction of all parameter states (attribute information) of a target in the physical world in the digital twin network.

Figure 5:
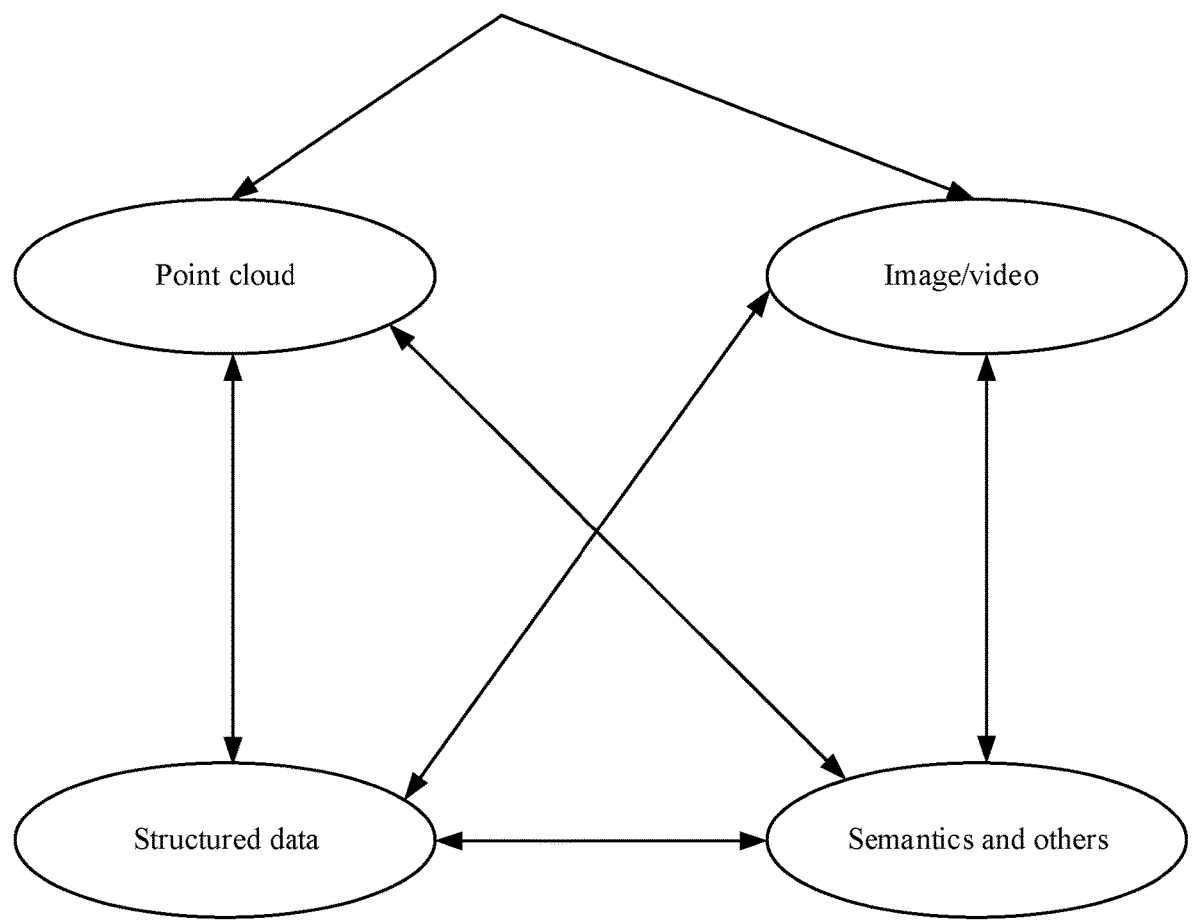
FIG. 5 exemplarily shows a schematic diagram of adjustment of a representation method according to an embodiment of this disclosure.

As shown in FIG. 5, different methods (called as representation manners or representation methods) may be used for synchronously presenting, in the twin world, the attribute information of the targets in the physical world. For example, point cloud data of a physical entity is obtained by radar scanning, or through video image data (i.e., video data or image data, which may also be referred as an image/video) of a target captured by a camera or a visual sensor, by identifying the target through an image and picture processing method, structured data of a physical entity is obtained and then transmitted, or captured video image data of a physical entity is directly transmitted, or a physical entity is described semantically. In the methods based on point cloud data, video image data, structured data, and semantic data, attribute information of the physical entity required by the real-time digital twinning application terminal can be transmitted. The network transmission data amounts required by different representation methods may be different.

Figure 4:
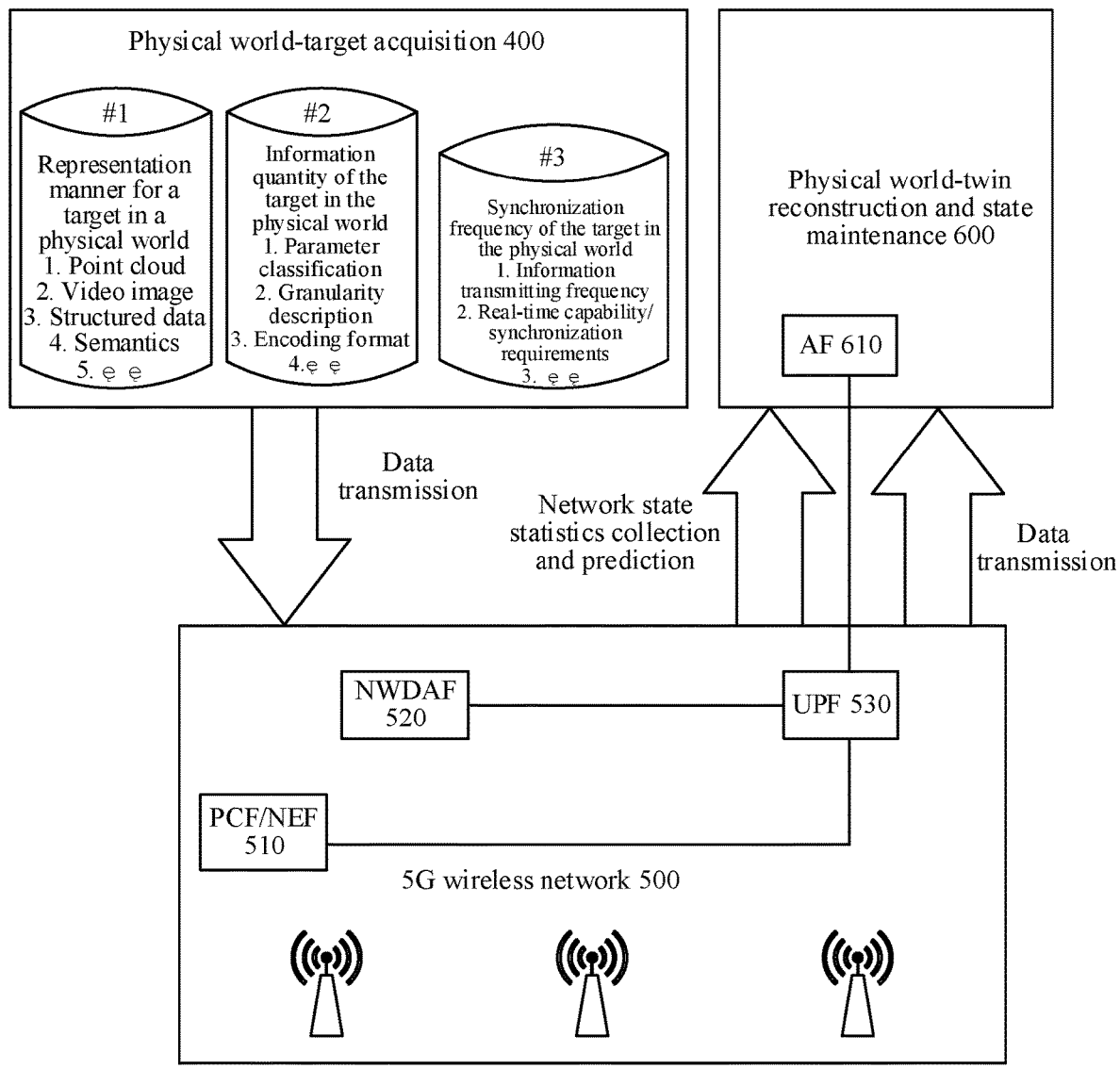
FIG. 4 exemplarily shows a schematic diagram of an adaptive wireless network architecture supporting real-time digital twin according to an embodiment of this disclosure.

Based on the foregoing considerations, an adaptive wireless network architecture supporting real-time digital twinning, as shown in FIG. 4, is provided in embodiments of this disclosure.

As shown in FIG. 4, the embodiments of this disclosure provide an adaptive wireless network architecture supporting real-time digital twinning. In this architecture, a real-time digital twinning application may change a method of the real-time digital twinning application depending on a resource condition of a wireless network. For example, the granularity (e.g., adjusting a second representation information quantity to a first representation information quantity) and time frequency (e.g., adjusting a second representation information frequency to a first representation information frequency) described by attribute information/state information of a physical entity digital twin in real time may be adjusted to adapt to a current first network state of the wireless network.

As shown in FIG. 4, a real-time digital twinning application 600 may be used for digital twin reconstruction and state maintenance in the digital world, and the real-time digital twinning application 600 can interact with a 5G core (5GC) network 500 (i.e., a 5G wireless network in FIG. 4) through an AF network element 610. The AF network element 610 can provide a policy control function (PCF)/network exposure function (NEF) network element 510 with QoS characteristics (e.g., the second QoS requirement) required by real-time digital twinning. The 5G wireless network 500 perform a transmission by establishing a first PDU session.

At the same time, the 5G wireless network 500 can acquire a real-time operation state of a network according to a network state predictive analysis function provided by a NWDAF network element 520. For example, the NWDAF network element 520 transmits the acquired real-time operation state of the network to a user plane function (UPF) network element 530. If the network bandwidth is insufficient, the real-time operating state of the network may change from a second network state to a first network state, and feedback information can be provided to the AF network element 610 via an interface between the AF network element 610 and the 5GC, for example, providing feedback information through a network state notification message. In the embodiment of FIG. 4, an acquisition function 400 for attribute information of a target in the physical world is used as a terminal side, and a reproduction application in the digital world is used as an application side AF.

After receiving the feedback information indicating an insufficient 5G network bandwidth fed back by the NWDAF network element 520, the AF network element 610 provides the feedback information to the real-time digital twinning application module. Depending on a current bandwidth quantity (a parameter in the first QoS requirement), any one or more of the following three aspects at an application layer may be adjusted:

The first aspect is adjustment of representation manners, including but not limited to the following manners:
  1. Point cloud data: describing a 3-dimension (3D) outline of an object/entity, and transmitting point cloud data to a digital twin over a network;

2. Video image data: directly capturing image and/or video data of a target in the physical world and transmitting data to the digital twinning application terminal for twinning processing;
3. Structured data: identifying an object by artificial intelligence (AI), and describing the object as structured data, for example, describing the type, size, parameters, etc. of the object;
4. Semantic: directly communicating in a semantic manner.

The second aspect is adjustment of representation information quantities to implement information quantity control:
1. Parameter classification;
2. Adjustment of description granularity, for example, granularity of point cloud data can be adjusted;
3. Adjustment of encoding formats of attribute information;
4. Others, for example, the resolution of a video and image can be adjusted.

The third aspect is representation information frequency and reliability/synchronization (also called as real-time capability) requirements for implementing information quantity control:
1. the information transmission frequency can be adjusted, and the frequency refers to the number of information transmissions required per unit time;
2. the real-time capability/synchronization requirement can be adjusted, and the synchronization and reliability requirements refer to synchronization accuracy and reliability requirements for a transceiving terminal when transmitting information. The higher the requirements, the smaller the delay in transmitting data by ultra reliable low latency communication (URLLC) provided by an underlying network.

The adjustment contents of the foregoing aspects may be adjusted individually, or may be adjusted simultaneously.

For example, taking the physical entity being a vehicle as an example, the point cloud data may be used for describing a 3D outline of the vehicle, a camera or a visual sensor may be used for capturing video image data of the vehicle, and AI may be used for processing the video image data of the vehicle to obtain the structured data of the vehicle, or in a case that the word "vehicle" is directly used for describing the semantic meaning of the vehicle, and it is assumed that information quantities required by point cloud data, video image data, structured data, and semantic description decrease in order, assuming that at initial, the bandwidth of the wireless network is sufficient and the attribute information of the vehicle is described by using the point cloud data (i.e., it is assumed that a second representation manner is used), then when the NWDAF network element detects that the network bandwidth of the wireless network is insufficient, the AF network element may select a corresponding first QoS requirement according to the changed network bandwidth, such that a terminal determines which representation manner is used as a first representation manner. For example, if the network bandwidth is seriously insufficient, the semantic data may be selected for representation; if the network bandwidth is slightly insufficient, the video image data may be selected to for representation; and if the network bandwidth is comparatively insufficient, the structured data may be selected for representation.

The information quantities required for point cloud data, video image data, structured data, and semantic description of the same physical entity are not necessarily the case of decreasing in order in the foregoing example, and the information quantity required for each different representation manner may be determined depending on actual situations.

For another example, taking the physical entity being a vehicle as an example again, assuming that both the first representation manner and the second representation manner are point cloud data, when the NWDAF network element detects that the wireless network bandwidth is insufficient, the AF network element may select the corresponding first QoS requirement according to the changed network bandwidth, such that the terminal determines which representation information quantity is used as the first representation information quantity. For example, if the network bandwidth is insufficient, the granularity of the point cloud data may be reduced to adapt to the current network bandwidth.

For another example, taking the physical entity being a vehicle as an example again, assuming that both the first representation manner and the second representation manner are video image data, when the NWDAF network element detects that the wireless network bandwidth is insufficient, the AF network element may select the corresponding first QoS requirement according to the changed network bandwidth, such that the terminal determines which representation information quantity is used as the first representation information quantity.

For example, if the network bandwidth is insufficient, the resolution of the video image data can be reduced to adapt to the current network bandwidth, for example, the resolution of the video image data can be reduced from 2K (2560*1440 pixels) to 1080P (the resolution of 1080P is 1920*1080 pixels), such that the data quantity of video image data generated per unit of time can be reduced to reduce the occupied network bandwidth.

For another example, taking the physical entity being a vehicle as an example again, assuming that both the first representation manner and the second representation manner are video image data, when the NWDAF network element detects that the wireless network bandwidth is insufficient, the AF network element may select the corresponding first QoS requirement according to the changed network bandwidth, such that the terminal determines which representation information quantity is used as the first representation information quantity. For example, if the network bandwidth is insufficient, a previously used second encoding format may be adjusted to the first encoding format to adapt to the current network bandwidth.

Encoding parameters (such as bit rate, frame rate, and resolution) of the first encoding format are lower than encoding parameters of the second encoding format, so that the amount of video image data generated per unit time can be reduced to reduce the occupied network bandwidth.

For another example, taking the physical entity being a vehicle as an example again, assuming that both the first representation manner and the second representation manner are video image data, when the NWDAF network element detects that the wireless network bandwidth is insufficient, the AF network element may select the corresponding first QoS requirement according to the changed network bandwidth, such that the terminal determines which representation information frequency is used as the first representation information frequency.

For example, if the network bandwidth is insufficient, the previous second representation information frequency can be reduced to the first representation information frequency to adapt to the current network bandwidth, for example, the second representation information frequency is: reporting 10 times per minute, and the first representation information frequency is: reporting 5 times per minute, such that the times of reporting representation information per unit time can be reduced to reduce the occupied network bandwidth.

Figure 6:
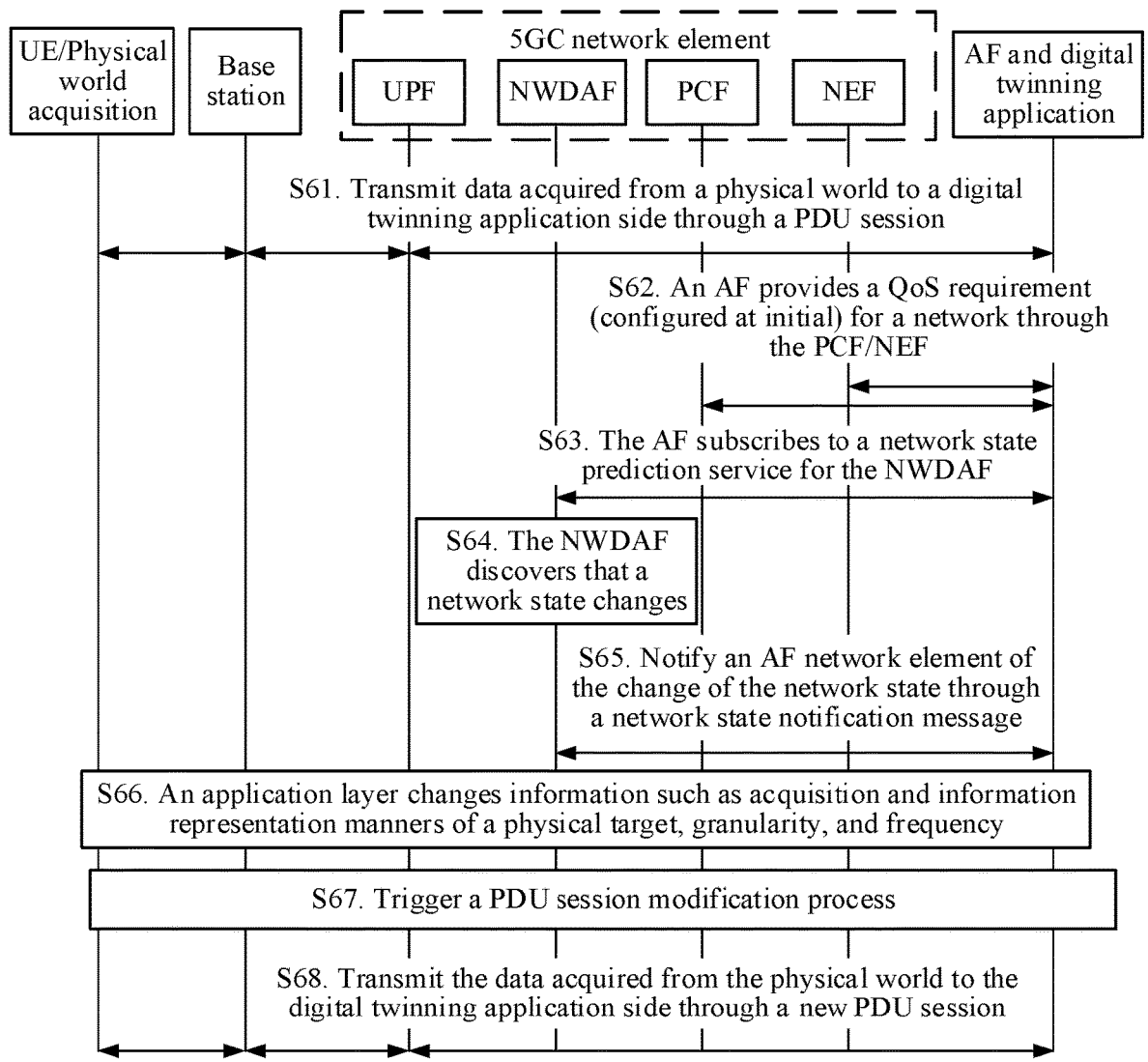
FIG. 6 exemplarily shows a schematic diagram of transmission by updating a protocol data unit (PDU) session after changing an information acquisition and transmission mechanism according to an embodiment of this disclosure.

In the embodiment shown in FIG. 6, after an information acquisition and transmission mechanism is changed, the acquired attribute information of the physical entity may be transmitted by updating a PDU session.

As shown in FIG. 6, a 5GC network element may include a UPF, a NWDAF, a PCF and a NEF.

As shown in FIG. 6, the method may include the following steps:

In step S61, a UE/physical world acquisition terminal transmits, through a PDU session (also called as a first PDU session), data acquired from the physical world to a digital twinning application side (an AF and a digital twinning application of a digital twinning application terminal).

The UE/physical world acquisition terminal may transmit, through a base station and a UPF network element, the data acquired from the physical world to the digital twinning application side.

In step S62, an AF network element provides a QoS requirement (called as a second QoS requirement, configured at initial) for a network through a PCF/NEF network element.

In step S63, the AF network element subscribes to a network state prediction service for a NWDAF.

Step S63 may include that the AF network element transmits a network state prediction service subscription request message to the NWDAF; and the NWDAF receives the network state prediction service subscription request message, and generates a network state prediction service subscription response message. The NWDAF transmits the network state prediction service subscription response message to the AF network element, and the AF network element receives the network state prediction service subscription response message.

In step S64, the NWDAF network element discovers that a network state changes.

For example, the network state is changed from a second network state to a first network state.

In step S65, the NWDAF network element notifies the AF network element of the change of the network state through a network state notification message.

In step S66, an application layer changes information such as acquisition and information representation manners of a physical target, granularity, and frequency. That is, the AF network element may change the second QoS requirement to a first QoS requirement according to the first network state, so that the transmission rate of the UE/physical world acquisition terminal is changed from a second information transmission rate in S61 to a first information transmission rate, so as to adapt to the first QoS requirement.

In step S67, the UE/physical world acquisition terminal triggers a PDU session modification process.

The UE/physical world acquisition terminal may trigger a PDU session modification process of the first PDU session according to the modified first QoS requirement, and establish a new PDU session, called as a second PDU session.

In step S68, the UE/physical world acquisition terminal may transmit, through the new PDU session, the data acquired from the physical world to the digital twinning application side.

Step S61 and S62 above can be omitted. That is, the AF network element is not necessarily required to configure the second QoS requirement at initial, and the UE/physical world acquisition terminal is not necessarily required to make adjustment based on the second information transmission rate to obtain the first information transmission rate.

Figure 7:
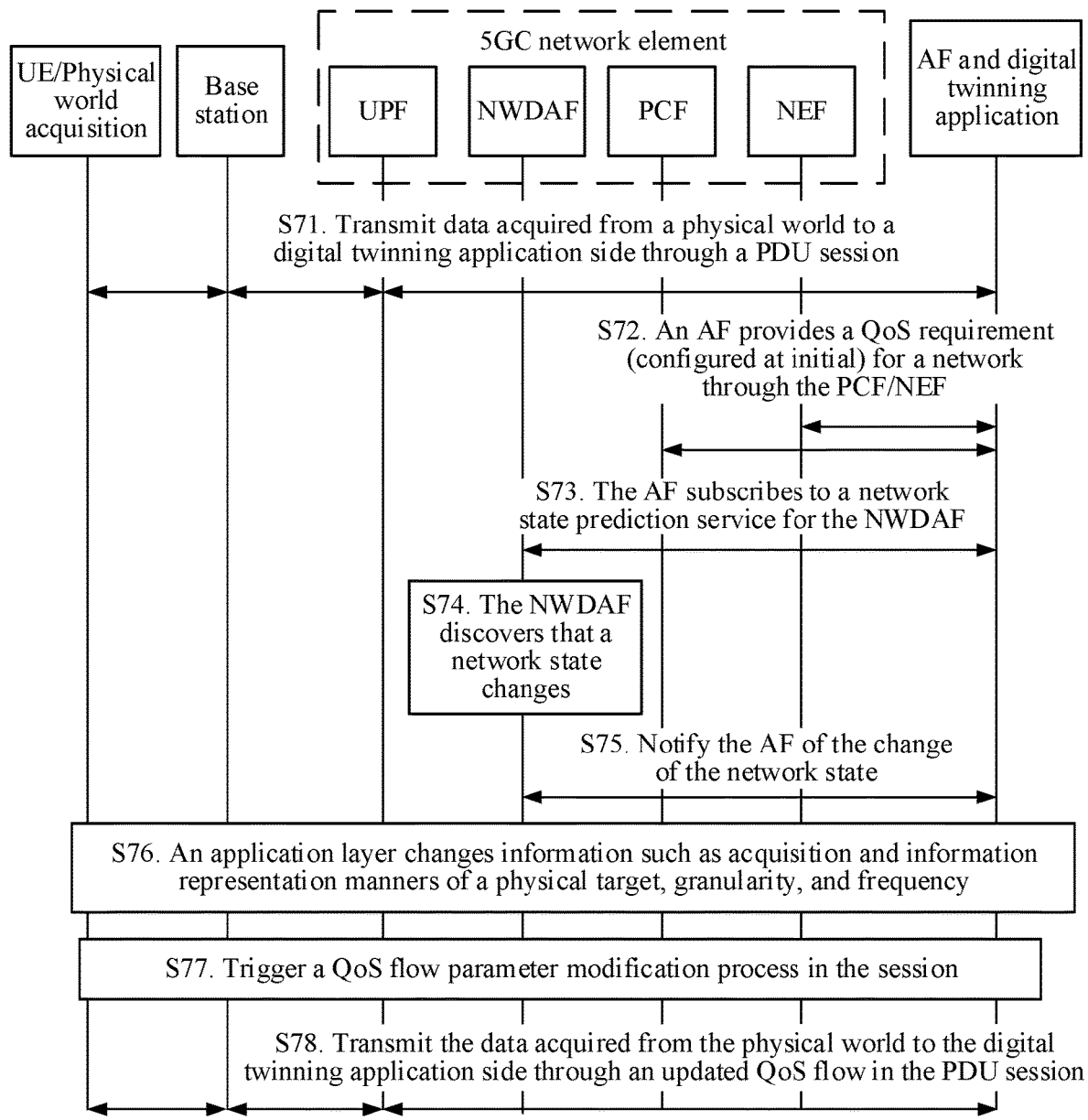
FIG. 7 exemplarily shows a flowchart of transmission by different quality of service (QoS) flows in an original PDU session after changing an information acquisition and transmission mechanism according to an embodiment of this disclosure.

In the embodiment shown in FIG. 7, after an information acquisition and transmission mechanism is changed, the acquired attribute information of a physical entity may be transmitted through different QoS flows in the original PDU session (the first PDU session).

As shown in FIG. 7, the method may include the following steps:

In step S71, a UE/physical world acquisition terminal transmits, through a PDU session (also called as a first PDU session), data acquired from the physical world to a digital twinning application side (an AF and a digital twinning application of a digital twinning application terminal).

The UE/physical world acquisition terminal may transmit, through a base station and a UPF network element, the data acquired from the physical world to the digital twinning application side.

In step S72, an AF network element provides a QoS requirement (called as a second QoS requirement, configured at initial) for a network through a PCF/NEF network element.

In step S73, the AF network element subscribes to a network state prediction service for a NWDAF.

Step S73 may include that the AF network element transmits a network state prediction service subscription request message to the NWDAF; and the NWDAF receives the network state prediction service subscription request message, and generates a network state prediction service subscription response message. The NWDAF transmits the network state prediction service subscription response message to the AF network element, and the AF network element receives the network state prediction service subscription response message.

In step S74, the NWDAF network element discovers that a network state changes.

For example, the network state is changed from a second network state to a first network state.

In step S75, the NWDAF network element notifies the AF network element of the change of the network state through a network state notification message.

In step S76, an application layer changes information such as acquisition and information representation manners of a physical target, granularity, and frequency. That is, the AF network element may change the second QoS requirement to a first QoS requirement according to the first network state, so that the transmission rate of the UE/physical cal world acquisition terminal is changed from a second information transmission rate in S71 to a first information transmission rate, so as to adapt to the first QoS requirement.

In step S77, the UE/physical world acquisition terminal triggers a QoS flow parameter modification process.

The UE/physical world acquisition terminal may trigger an intra-session QoS flow parameter modification process of the first PDU session according to the modified first QoS requirement.

In step S78, the UE/physical world acquisition terminal may transmit the data acquired from the physical world to the digital twinning application side through an updated QoS flow in the PDU session (i.e., the first PDU session).

Steps S71 and S72 above can be omitted. That is, the AF network element is not necessarily required to configure the second QoS requirement at initial, and the UE/physical world acquisition terminal is not necessarily required to make adjustment based on the second information transmission rate to obtain the first information transmission rate.

The foregoing embodiments are described by taking the 5G wireless network as an example, but the embodiments of this disclosure are not limited thereto. For example, the solution according to the embodiments of this disclosure can also be implemented by communication systems such as a 6G wireless network. Moreover, the UPF, NWDAF, PCF, NEF, and AF network elements used in the description in the foregoing examples may have different names with the development of network technology, and the scopes of protection of this disclosure shall not be limited thereto.

Figure 8:
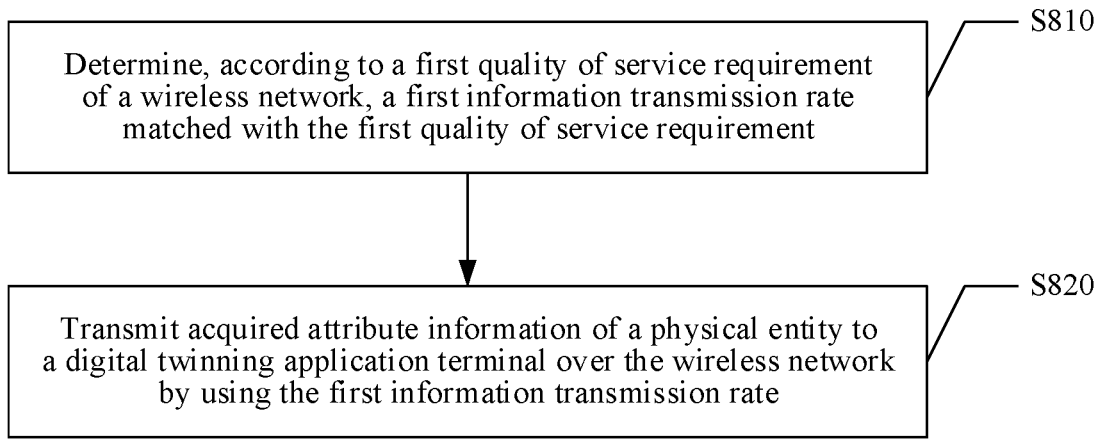
FIG. 8 is a flowchart of a data transmission method according to another embodiment of this disclosure.

A data transmission method provided in the embodiment of FIG. 8 can be executed by a terminal.

As shown in FIG. 8, the method provided in the embodiment of this disclosure may include the following steps:

In step S810, a first information transmission rate matched with a first quality of service requirement is determined according to the first quality of service requirement of a wireless network, where the first quality of service requirement may be determined according to a first network state of the wireless network.

For example, a digital twinning application terminal may be configured to determine the first quality of service requirement according to the first network state of the wireless network.

In an exemplary embodiment, before the determining, according to a first quality of service requirement of a wireless network, a first information transmission rate matched with the first quality of service requirement, the method may further include: determining, according to a second quality of service requirement of the wireless network, a second information transmission rate matched with the second quality of service requirement, where the second quality of service requirement may be determined according to a second network state of the wireless network; and transmitting acquired attribute information of a physical entity to the digital twinning application terminal over the wireless network by using the second information transmission rate. The attribute information of the physical entity transmitted at the second information transmission rate may be used for constructing or updating a digital twin corresponding to the physical entity.

In an exemplary embodiment, the determining, according to a second quality of service requirement of the wireless network, a second information transmission rate matched with the second quality of service requirement may include: determining a second representation manner, a second representation information quantity, and a second representation information frequency according to the second quality of service requirement; and determining the second information transmission rate according to the second representation manner, the second representation information quantity, and the second representation information frequency.

The determining, according to a first quality of service requirement of a wireless network, a first information transmission rate matched with the first quality of service requirement may include: adjusting at least one of the second representation manner, the second representation information quantity, and the second representation information frequency according to the first quality of service requirement, so as to determine at least one of a first representation manner, a first representation information quantity, and a first representation information frequency; and determining the first information transmission rate according to at least one of the first representation manner, the first representation information quantity, and the first representation information frequency.

In an exemplary embodiment, the first representation manner and the second representation manner may include but are not limited to at least one of the following: point cloud data of the physical entity; video image data of the physical entity; structured data of the physical entity; and semantic data of the physical entity.

In an exemplary embodiment, the first representation information quantity and the second representation information quantity may include but are not limited to at least one of the following: granularity of point cloud data of the physical entity; resolution of video image data of the physical entity; and an encoding format of the attribute information of the physical entity.

In an exemplary embodiment, the determining, according to a second quality of service requirement of the wireless network, a second information transmission rate matched with the second quality of service requirement may include: determining a second representation manner, a second representation information quantity, a second representation information frequency, a second reliability requirement, and a second synchronization requirement according to the second quality of service requirement; and determining the second information transmission rate according to the second representation manner, the second representation information quantity, the second representation information frequency, the second reliability requirement, and the second synchronization requirement.

The determining, according to a first quality of service requirement of a wireless network, a first information transmission rate matched with the first quality of service requirement may include: adjusting at least one of the second representation manner, the second representation information quantity, the second representation information frequency, the second reliability requirement, and the second synchronization requirement according to the first quality of service requirement, so as to determine a first representation manner, a first representation information quantity, a first representation information frequency, a first reliability requirement, and a first synchronization requirement; and determining the first information transmission rate according to the first representation manner, the first representation information quantity, the first representation information frequency, the first reliability requirement, and the first synchronization requirement.

In step S820, the acquired attribute information of a physical entity is transmitted to a digital twinning application terminal over the wireless network by using the first information transmission rate. The attribute information of the physical entity transmitted at the first information transmission rate may be used for constructing or updating a digital twin corresponding to the physical entity.

For example, the digital twinning application terminal may be configured to construct or update the digital twin corresponding to the physical entity according to the attribute information of the physical entity received at the first information transmission rate.

In an exemplary embodiment, the transmitting the acquired attribute information of the physical entity to the digital twinning application terminal over the wireless network by using the second information transmission rate may include: transmitting the attribute information to the digital twinning application terminal over the wireless network through a first protocol data unit (PDU) session by using the second information transmission rate.

The transmitting acquired attribute information of a physical entity to the digital twinning application terminal over the wireless network by using the first information transmission rate may include: triggering a PDU session change process of the first PDU session according to the first quality of service requirement of the wireless network, to establish a second PDU session; and transmitting the attribute information to the digital twinning application terminal over the wireless network through the second PDU session by using the first information transmission rate.

In an exemplary embodiment, the transmitting the acquired attribute information of the physical entity to the digital twinning application terminal over the wireless network by using the second information transmission rate may include: transmitting the attribute information to the digital twinning application terminal over the wireless network through a first protocol data unit (PDU) session by using the second information transmission rate.

The transmitting acquired attribute information of a physical entity to the digital twinning application terminal over the wireless network by using the first information transmission rate may include: triggering a quality of service flow parameter change process of the first PDU session according to the first quality of service requirement of the wireless network, to update a quality of service flow in the first PDU session; and transmitting the attribute information to the digital twinning application terminal over the wireless network through the updated quality of service flow in the first PDU session by using the first information transmission rate.

For other contents of the embodiment in FIG. 8, reference may be made to the contents of other embodiments above.

Figure 9:
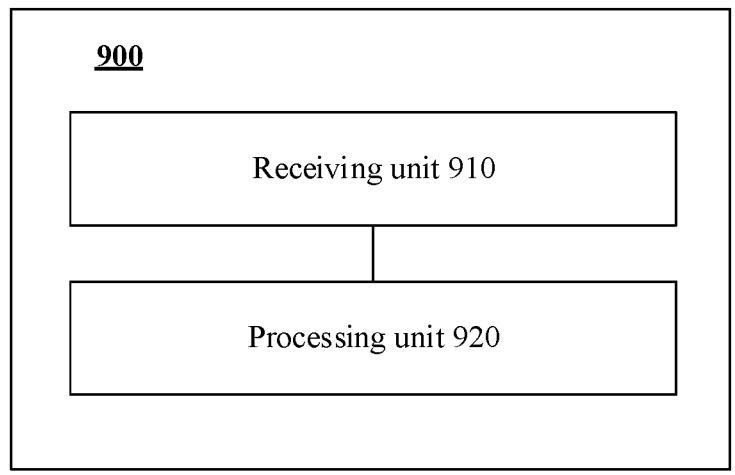
FIG. 9 exemplarily shows a block diagram of a digital twinning application terminal according to an embodiment of this disclosure.

As shown in FIG. 9, a digital twinning application terminal 900 provided in the embodiment of FIG. 9 may include: a receiving unit 910 and a processing unit 920.

The receiving unit 910 may be configured to receive a network state notification message of a wireless network from a first core network element of the wireless network, the network state notification message indicating that the wireless network is in a first network state.

The processing unit 920 may be configured to determine a first quality of service requirement of the wireless network according to the first network state in the network state notification message.

The receiving unit 910 may further be configured to receive, over the wireless network, at a first information transmission rate, attribute information of a physical entity acquired by a terminal, the first information transmission rate being matched with the first quality of service requirement.

The processing unit 920 may further be configured to construct or update a digital twin corresponding to the physical entity according to the attribute information of the physical entity received at the first information transmission rate.

In an exemplary embodiment, the network state notification message may indicate that the wireless network changes from a second network state to the first network state.

The processing unit 920 may further be configured to: before the receiving a network state notification message of a wireless network from a first core network element of the wireless network, determine a second quality of service requirement of the wireless network according to the second network state. The receiving unit 910 may further be configured to: receive, over the wireless network in the second network state, at a second information transmission rate, attribute information of the physical entity acquired by the terminal, the second information transmission rate being matched with the second quality of service requirement. The processing unit 920 may further be configured to: construct or update a digital twin corresponding to the physical entity according to the attribute information of the physical entity received at the second information transmission rate.

In an exemplary embodiment, the second information transmission rate may be determined according to a second representation manner, a second representation information quantity, and a second representation information frequency used by the attribute information.

The processing unit 920 may further be configured to: adjust at least one of bandwidth, time delay, and jitter in the second quality of service requirement according to the first network state, to obtain the first quality of service requirement.

The first quality of service requirement may be used for adjusting at least one of the second representation manner, the second representation information quantity, and the second representation information frequency, so as to determine a first representation manner, a first representation information quantity, and a first representation information frequency. The first representation manner, the first representation information quantity, and the first representation information frequency may be used for determining the first information transmission rate.

In an exemplary embodiment, the digital twinning application terminal 900 may further includes a transmitting unit. The transmitting unit may be configured to transmit a network state prediction service subscription request message to the first core network element. The receiving unit 910 may further be configured to receive a network state prediction service subscription response message returned by the first core network element.

For other contents of the embodiment in FIG. 9, reference may be made to the other embodiments above.

Figure 10:
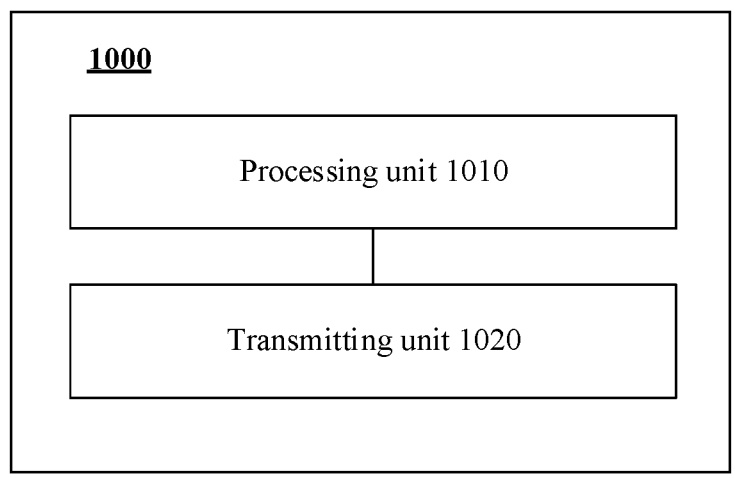
FIG. 10 exemplarily shows a block diagram of a terminal according to an embodiment of this disclosure.

As shown in FIG. 10, a terminal 1000 provided in the embodiment of FIG. 10 may include: a processing unit 1010 and a transmitting unit 1020.

The processing unit 1010 may be configured to determine, according to a first quality of service requirement of a wireless network, a first information transmission rate matched with the first quality of service requirement, the first quality of service requirement being determined according to a first network state of the wireless network.

The transmitting unit 1020 may be configured to transmit acquired attribute information of a physical entity to a digital twinning application terminal over the wireless network by using the first information transmission rate.

The attribute information of the physical entity transmitted at the first information transmission rate may be used for constructing or updating a digital twin corresponding to the physical entity.

In an exemplary embodiment, the processing unit 1010 may further be configured to: before the determining, according to a first quality of service requirement of a wireless network, a first information transmission rate matched with the first quality of service requirement, determine, according to a second quality of service requirement of the wireless network, a second information transmission rate matched with the second quality of service requirement. The second quality of service requirement is determined according to a second network state of the wireless network. The transmitting unit 1020 may further be configured to transmit the acquired attribute information of the physical entity to the digital twinning application terminal over the wireless network by using the second information transmission rate.

The attribute information of the physical entity transmitted at the second information transmission rate may be used for constructing or updating a digital twin corresponding to the physical entity.

In an exemplary embodiment, the processing unit 1010 may further be configured to: determine a second representation manner, a second representation information quantity, and a second representation information frequency according to the second quality of service requirement; and determine the second information transmission rate according to the second representation manner, the second representation information quantity, and the second representation information frequency.

The processing unit 1010 may further be configured to: adjust at least one of the second representation manner, the second representation information quantity, and the second representation information frequency according to the first quality of service requirement, so as to determine a first representation manner, a first representation information quantity, and a first representation information frequency; and determine the first information transmission rate according to the first representation manner, the first representation information quantity, and the first representation information frequency.

In an exemplary embodiment, the first representation manner and the second representation manner may include at least one of the following: point cloud data of the physical entity; video image data of the physical entity; structured data of the physical entity; and semantic data of the physical entity.

In an exemplary embodiment, the first representation information quantity and the second representation information quantity may include at least one of the following: granularity of point cloud data of the physical entity; resolution of video image data of the physical entity; and an encoding format of the attribute information of the physical entity.

In an exemplary embodiment, the processing unit 1010 may further be configured to: determine a second representation manner, a second representation information quantity, a second representation information frequency, a second reliability requirement, and a second synchronization requirement according to the second quality of service requirement; and determine the second information transmission rate according to the second representation manner, the second representation information quantity, the second representation information frequency, the second reliability requirement, and the second synchronization requirement.

The processing unit 1010 may further be configured to: adjust at least one of the second representation manner, the second representation information quantity, the second representation information frequency, the second reliability requirement, and the second synchronization requirement according to the first quality of service requirement, so as to determine a first representation manner, a first representation information quantity, a first representation information frequency, a first reliability requirement, and a first synchronization requirement; and determine the first information transmission rate according to the first representation manner, the first representation information quantity, the first representation information frequency, the first reliability requirement, and the first synchronization requirement.

In an exemplary embodiment, the transmitting unit 1020 may further be configured to: transmit the attribute information to the digital twinning application terminal over the wireless network through a first protocol data unit (PDU) session by using the second information transmission rate.

The transmitting unit 1020 may further be configured to: trigger a PDU session change process of the first PDU session according to the first quality of service requirement of the wireless network, to establish a second PDU session; and transmit the attribute information to the digital twinning application terminal over the wireless network through the second PDU session by using the first information transmission rate.

In an exemplary embodiment, the transmitting unit 1020 may further be configured to: transmit the attribute information to the digital twinning application terminal over the wireless network through a first protocol data unit (PDU) session by using the second information transmission rate.

The transmitting unit 1020 may further be configured to: trigger a quality of service flow parameter change process of the first PDU session according to the first quality of service requirement of the wireless network, to update a quality of service flow in the first PDU session; and transmit the attribute information to the digital twinning application terminal over the wireless network through the updated quality of service flow in the first PDU session by using the first information transmission rate.

For other contents of the embodiment in FIG. 10, reference may be made to the other embodiments above.

Figure 11:
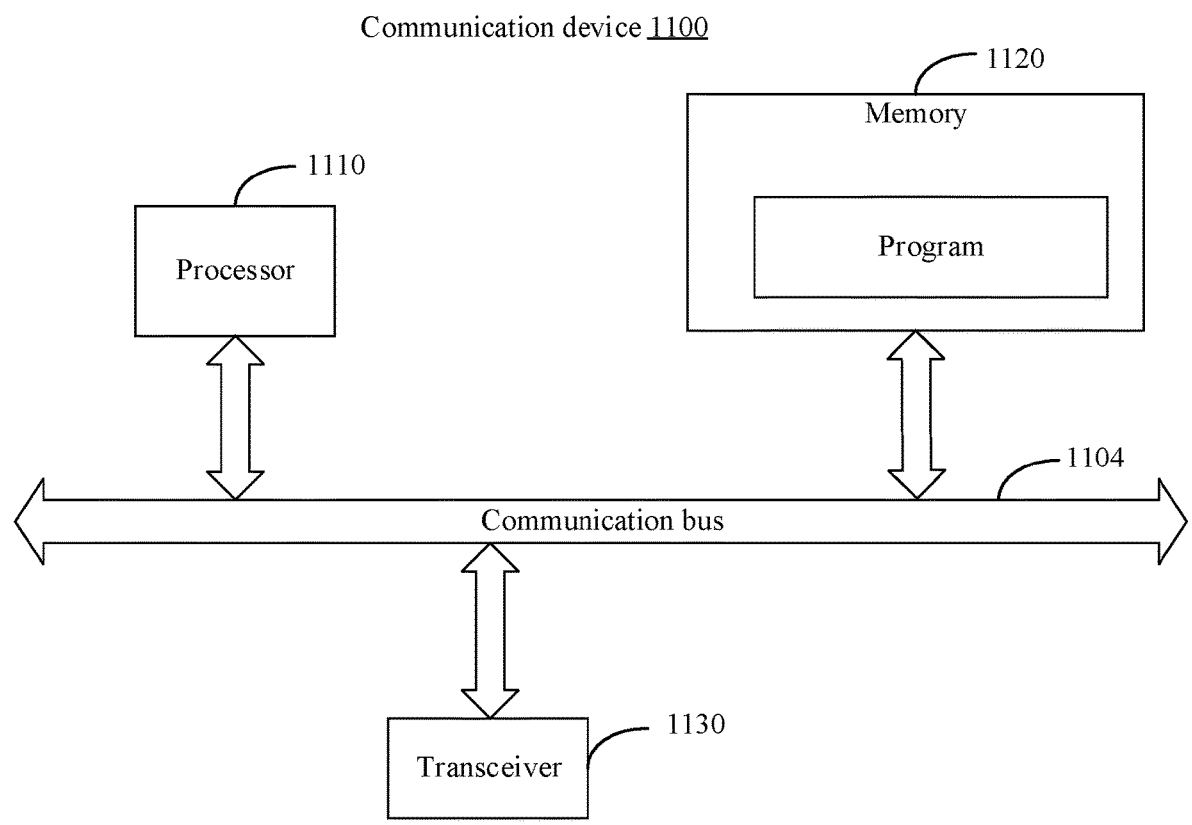
FIG. 11 exemplarily shows a schematic structural diagram of a communication device according to an embodiment of this disclosure.

FIG. 11 exemplarily shows a schematic structural diagram of a communication device 1100 according to an embodiment of this disclosure. The communication device may be a terminal, or may be a core network device, such as an NWDAF network element, a PCF network element, an NEF network element, and a UPF network element, or may be a digital twinning application terminal or an AF network element. The communication device 1100 shown in FIG. 11 includes a processor 1110. The processor 1110 may invoke from a memory a computer program and execute same to implement the methods in the embodiments of this disclosure.

In some embodiments, as shown in FIG. 11, the communication device 1100 may further includes a memory 1120. The processor 1110 may invoke from the memory 1120 a computer program and run same to implement the methods in the embodiments of this disclosure.

The memory 1120 may be an independent device independent of the processor 1110, or may be integrated in the processor 1110.

In some embodiments, as shown in FIG. 11, the communication device 1100 may also include a transceiver 1130, and the processor 1110 may control the transceiver 1130 to communicate with other devices, specifically, transmit information or data to other devices or receive information or data transmitted by other devices.

The transceiver 1130 may include a transmitter and a receiver. The transceiver 1130 may further include antennas, and one or more antennas may be provided.

In some embodiments, the communication device 1100 may be a core network device of the embodiments of this disclosure, and the communication device 1100 may implement a corresponding process implemented by the core network device in each method in the embodiments of this disclosure. For the purpose of brevity, details are not described herein again.

In some embodiments, the communication device 1100 may be a mobile terminal/terminal in the embodiments of this disclosure, and the communication device 1100 may implement a corresponding process implemented by the mobile terminal/terminal in each method in the embodiments of this disclosure. For the purpose of brevity, details are not described herein again.

In some embodiments, the communication device 1100 may be a digital twinning application terminal in the embodiments of this disclosure, and the communication device 1100 may implement a corresponding process implemented by the digital twinning application terminal in each method in the embodiments of this disclosure. For the purpose of brevity, details are not described herein again.

The processor in the embodiments of this disclosure may be an integrated circuit chip, and have a signal processing capability. In an implementation process, the steps in the foregoing method embodiments may be implemented by processing circuitry, such as an integrated logic circuit of hardware in the processor or by instructions in the form of software.

The processor may be a general-purpose processor, a digital signal processor (DSP), an application specific integrated circuit (ASIC), a field programmable gate array (FPGA), or other programmable logic devices, discrete gate or transistor logic devices, and discrete hardware components. The processor may implement or execute the methods, the steps, and logic block diagrams recited in the embodiments of this disclosure. The general-purpose processor may be a microprocessor, or the processor may be any conventional processor or the like. The steps of the methods recited with reference to the embodiments of this disclosure may be directly performed and completed by using a hardware decoding processor, or may be performed and completed by using a combination of hardware and software modules in the decoding processor. The software module may be stored in a storage medium that is mature in the art, such as a random access memory, a flash memory, a read-only memory, a programmable ROM, an electrically erasable programmable memory, or a register. The storage medium is located in the memory. The processor reads information in the memory and completes the steps of the methods in combination with hardware thereof.

The memory in the embodiments of this disclosure may be a volatile memory or a non-volatile memory, or may include both a volatile memory and a non-volatile memory. The non-volatile memory may be a read-only memory (ROM), a programmable ROM (PROM), an erasable PROM (EPROM), an electrically EPROM (EEPROM), or a flash memory. The volatile memory may be a random access memory (RAM) serving as an external cache. By way of examples but not limitation, RAMs in many forms, for example, a static RAM (SRAM), a dynamic RAM (DRAM), a synchronous DRAM (SDRAM), a double data rate SDRAM (DDR SDRAM), an enhanced SDRAM (ESDRAM), a synchlink DRAM (SLDRAM), and a direct rambus RAM (DR RAM), are available. The memory in the systems and methods described in this disclosure includes, but is not limited to these memories and any other suitable types. The foregoing memories are examples but not limitations.

The embodiments of this disclosure further provide a computer readable storage medium, such as a non-transitory computer-readable storage medium for storing a computer program.

In some embodiments, the computer readable storage medium may be applied to a core network device of the embodiments of this disclosure, and the computer program enables a computer to execute a corresponding process implemented by the core network device in each method in the embodiments of this disclosure. For the purpose of brevity, details are not described herein again.

In some embodiments, the computer readable storage medium may be applied to a mobile terminal/terminal in the embodiments of this disclosure, and the computer program enables a computer to execute a corresponding process implemented by the mobile terminal/terminal in each method in the embodiments of this disclosure. For the purpose of brevity, details are not described herein again.

In some embodiments, the computer readable storage medium may be a digital twinning application terminal in the embodiments of this disclosure, and the computer program enables a computer to execute a corresponding process implemented by the digital twinning application terminal in each method in the embodiments of this disclosure. For the purpose of brevity, details are not described herein again.

The embodiments of this disclosure further provide a computer program product, including a computer program instruction.

In some embodiments, the computer program product may be applied to a core network device in the embodiments of this disclosure, and the computer program instruction enables a computer to execute a corresponding process implemented by the core network device in each method in the embodiments of this disclosure. For the purpose of brevity, details are not described herein again.

In some embodiments, the computer program product may be applied to a mobile terminal/terminal in the embodiments of this disclosure, and the computer program instruction enables a computer to execute a corresponding process implemented by the mobile terminal/terminal in each method in the embodiments of this disclosure. For the purpose of brevity, details are not described herein again.

In some embodiments, the computer program product may be applied to a digital twinning application terminal in the embodiments of this disclosure, and the computer program instruction enables a computer to execute a corresponding process implemented by the digital twinning application terminal in each method in the embodiments of this disclosure. For the purpose of brevity, details are not described herein again.

The embodiments of this disclosure further provide a computer program.

In some embodiments, the computer program may be applied to a core network device in the embodiments of this disclosure. The computer program, when running on a computer, enables the computer to execute a corresponding process implemented by the core network device in each method in the embodiments of this disclosure. For the purpose of brevity, details are not described herein again.

In some embodiments, the computer program may be applied to a mobile terminal/terminal in the embodiments of this disclosure. The computer program, when running on a computer, enables the computer to execute a corresponding process implemented by the mobile terminal/terminal in each method in the embodiments of this disclosure. For the purpose of brevity, details are not described herein again.

In some embodiments, the computer program may be applied to a digital twinning application terminal in the embodiments of this disclosure. The computer program, when running on a computer, enables the computer to execute a corresponding process implemented by the digital twinning application terminal in each method in the embodiments of this disclosure. For the purpose of brevity, details are not described herein again.

The exemplary units and algorithm steps described with reference to the embodiments recited in this disclosure can be implemented in electronic hardware, or a combination of computer software and electronic hardware. Whether these functions are implemented in hardware or software depends on the specific application and design constraints of the technical solution. Different methods may be used to implement the described functions for each particular application.

For simple and clear description, for exemplary work processes of the foregoing described system, apparatus, and unit, reference may be made to the corresponding process in the foregoing method embodiments, and details are not described herein again.

In the several embodiments provided in this disclosure, it is to be understood that, the recited system, apparatus, and method may be implemented in other manners. For example, the described apparatus embodiments are merely exemplary. For example, the unit division is merely logical function division and there may be other division in actual implementation. For example, a plurality of units or components may be combined or integrated into another system, or some features may be ignored or not performed.

The units described as separate parts may or may not be physically separate, and components displayed as units may or may not be physical units, that is, may be located in one position, or may be distributed on a plurality of network units. Some or all of the units may be selected based on actual needs to achieve the objectives of the solutions of the embodiments of this application.

In addition, functional units in the embodiments of this disclosure may be integrated into one processing unit, or each of the units may exist alone physically, or two or more units may be integrated into one unit.

If implemented in the form of software functional units and sold or used as an independent product, the functions may also be stored in a computer readable storage medium. Based on such an understanding, the technical solutions of this disclosure may be implemented in a form of a software product. The computer software product is stored in a storage medium and includes several instructions for instructing a computer device (which may be a personal computer, a server, a network device, or the like) to perform all or some of the steps of the methods described in the embodiments of this disclosure. The foregoing storage medium includes: any medium that can store program code, such as a USB flash drive, a removable hard disk, a read-only memory (ROM), a random access memory (RAM), a magnetic disk, or an optical disc.

The foregoing descriptions are merely exemplary implementations of this disclosure and are not intended to limit the scope of this disclosure. Variations or replacements are within the technical scope recited in this disclosure.

What is claimed is:

1. A method for data transmission, the method comprising:
    receiving a network state notification message of a wireless network from a first core network element of the wireless network, the network state notification message indicating that a network state of the wireless network changes from a second network state to a first network state;
    determining a first quality of service requirement of the wireless network according to the first network state indicated by the network state notification message;
    determining one of a first representation type, a first representation information quantity, and a first representation information frequency by adjusting a corresponding one of a second representation type, a second representation information quantity, and a second representation information frequency according to the first quality of service requirement, the first representation type, the first representation information quantity, and the first representation information frequency being associated with the first network state, and the second representation type, the second representation information quantity, and the second representation information frequency being associated with the second network state and based on a second quality of service requirement;
    determining a first information transmission rate associated with the first quality of service requirement according to the determined one of the first representation type, the first representation information quantity, and the first representation information frequency;
    receiving, at the determined first information transmission rate over the wireless network, first attribute information of a physical object acquired by a terminal; and
    constructing or updating a digital twin of the physical object according to the first attribute information of the physical object received at the first information transmission rate.

2. The method according to claim 1, wherein the method further comprises:
    determining the second quality of service requirement of the wireless network according to the second network state;
    receiving, at a second information transmission rate over the wireless network in the second network state, second attribute information of the physical object acquired by the terminal, the second information transmission rate being based on the second quality of service requirement; and
    constructing or updating the digital twin of the physical object according to the second attribute information of the physical object received at the second information transmission rate.

3. The method according to claim 2, wherein the second information transmission rate is determined according to the second representation type, the second representation information quantity, and the second representation information frequency associated with the second attribute information; and
    the determining the first quality of service requirement comprises:
    adjusting at least one of bandwidth, time delay, or jitter in the second quality of service requirement according to the first network state, to obtain the first quality of service requirement.

4. The method according to claim 1, further comprising:
    transmitting a network state prediction service subscription request message to the first core network element; and
    receiving a network state prediction service subscription response message from the first core network element.

5. A method for data transmission, the method comprising:
    determining one of a first representation type, a first representation information quantity, and a first representation information frequency by adjusting a corresponding one of a second representation type, a second representation information quantity, and a second representation information frequency according to a first quality of service requirement that is determined according to a first network state of a wireless network, the first representation type, the first representation information quantity, and the first representation information frequency being associated with the first network state, and the second representation type, the second representation information quantity, and the second representation information frequency being associated with a second network state of the wireless network and based on a second quality of service requirement;

determining a first information transmission rate associated with the first quality of service requirement according to the determined one of the first representation type, the first representation information quantity, and the first representation information frequency; and transmitting acquired first attribute information of a physical object to a digital twinning application terminal over the wireless network using the first information transmission rate, a digital twin of the physical object being constructed or updated based on the acquired first attribute information of the physical object.

6. The method according to claim 5, further comprising:
determining a second information transmission rate according to the second quality of service requirement of the wireless network, the second quality of service requirement being determined according to the second network state of the wireless network; and
transmitting acquired second attribute information of the physical object to the digital twinning application terminal over the wireless network using the second information transmission rate, the digital twin of the physical object being constructed or updated according to the acquired second attribute information of the physical object.

7. The method according to claim 6, wherein the determining the second information transmission rate comprises:
determining the second representation type, the second representation information quantity, and the second representation information frequency according to the second quality of service requirement; and
determining the second information transmission rate according to the second representation type, the second representation information quantity, and the second representation information frequency.

8. The method according to claim 7, wherein each of the first representation type and the second representation type comprise at least one of:
point cloud data of the physical object;
video image data of the physical object;
structured data of the physical object; or
semantic data of the physical object.

9. The method according to claim 7, wherein
the first representation information quantity includes at least one of:
a granularity of first point cloud data of the physical object,
a resolution of first video image data of the physical object, and
an encoding format of the acquired first attribute information of the physical object; and
the second representation information quantity includes at least one of:
a granularity of second point cloud data of the physical object,
a resolution of second video image data of the physical object, and
an encoding format of the acquired second attribute information of the physical object.

10. The method according to claim 6, wherein
the determining the second information transmission rate comprises:
determining the second representation type, the second representation information quantity, the second representation information frequency, a second reliability requirement, and a second synchronization requirement according to the second quality of service requirement, and
determining the second information transmission rate according to the second representation type, the second representation information quantity, the second representation information frequency, the second reliability requirement, and the second synchronization requirement; and
the determining the first information transmission rate comprises:
adjusting at least one of the second representation type, the second representation information quantity, the second representation information frequency, the second reliability requirement, or the second synchronization requirement according to the first quality of service requirement to determine at least one of the first representation type, the first representation information quantity, the first representation information frequency, a first reliability requirement, or a first synchronization requirement; and
determining the first information transmission rate according to the at least one of the first representation type, the first representation information quantity, the first representation information frequency, the first reliability requirement, or the first synchronization requirement.

11. The method according to claim 6, wherein
the transmitting the acquired second attribute information includes transmitting the acquired second attribute information to the digital twinning application terminal over the wireless network through a first protocol data unit (PDU) session using the second information transmission rate; and
the transmitting the acquired first attribute information comprises:
triggering a PDU session change process of the first PDU session according to the first quality of service requirement of the wireless network, to establish a second PDU session; and
transmitting the acquired first attribute information to the digital twinning application terminal over the wireless network through the second PDU session using the first information transmission rate.

12. The method according to claim 6, wherein
the transmitting the acquired second attribute information includes transmitting the acquired second attribute information to the digital twinning application terminal over the wireless network through a first protocol data unit (PDU) session using the second information transmission rate; and
the transmitting the acquired first attribute information comprises:
triggering a quality of service flow parameter change process of the first PDU session according to the first quality of service requirement of the wireless network, to update a quality of service flow in the first PDU session; and
transmitting the acquired first attribute information to the digital twinning application terminal over the wireless network through the updated quality of service flow in the first PDU session using the first information transmission rate.

13. An information processing apparatus, comprising: processing circuitry configured to:
determine one of a first representation type, a first representation information quantity, and a first representation information frequency by adjusting a corresponding one of a second representation type, a second representation information quantity, and a second representation information frequency according to a first quality of service requirement that is determined according to a first network state of a wireless network, the first representation type, the first representation information quantity, and the first representation information frequency being associated with the first network state, and the second representation type, the second representation information quantity, and the second representation information frequency being associated with a second network state of the wireless network and based on a second quality of service requirement;
determine a first information transmission rate associated with the first quality of service requirement according to the determined one of the first representation type, the first representation information quantity, and the first representation information frequency; and
transmit acquired first attribute information of a physical object to a digital twinning application terminal over the wireless network using the first information transmission rate, a digital twin of the physical object being constructed or updated based on the acquired first attribute information of the physical object.

14. The information processing apparatus according to claim 13, wherein the processing circuitry is configured to:
determine a second information transmission rate according to the second quality of service requirement of the wireless network, the second quality of service requirement being determined according to the second network state of the wireless network; and
transmit acquired second attribute information of the physical object to the digital twinning application terminal over the wireless network using the second information transmission rate, the digital twin of the physical object being constructed or updated according to the acquired second attribute information of the physical object.

15. The information processing apparatus according to claim 14, wherein the processing circuitry is configured to:
determine the second representation type, the second representation information quantity, and the second representation information frequency according to the second quality of service requirement; and
determine the second information transmission rate according to the second representation type, the second representation information quantity, and the second representation information frequency.

16. The information processing apparatus according to claim 15, wherein each of the first representation type and the second representation type comprise at least one of:
point cloud data of the physical object;
video image data of the physical object;
structured data of the physical object; or
semantic data of the physical object.

17. The information processing apparatus according to claim 15, wherein
the first representation information quantity includes at least one of:
a granularity of first point cloud data of the physical object,
a resolution of first video image data of the physical object, and
an encoding format of the acquired first attribute information of the physical object; and
the second representation information quantity includes at least one of:
a granularity of second point cloud data of the physical object,
a resolution of second video image data of the physical object, and
an encoding format of the acquired second attribute information of the physical object.

18. The information processing apparatus according to claim 14, wherein the processing circuitry is configured to:
determine the second representation type, the second representation information quantity, the second representation information frequency, a second reliability requirement, and a second synchronization requirement according to the second quality of service requirement;
determine the second information transmission rate according to the second representation type, the second representation information quantity, the second representation information frequency, the second reliability requirement, and the second synchronization requirement;
adjust at least one of the second representation type, the second representation information quantity, the second representation information frequency, the second reliability requirement, or the second synchronization requirement according to the first quality of service requirement to determine at least one of the first representation type, the first representation information quantity, the first representation information frequency, a first reliability requirement, or a first synchronization requirement; and
determine the first information transmission rate according to the at least one of the first representation type, the first representation information quantity, the first representation information frequency, the first reliability requirement, or the first synchronization requirement.

19. The information processing apparatus according to claim 18, wherein each of the first representation type and the second representation type comprise at least one of:
point cloud data of the physical object;
video image data of the physical object;
structured data of the physical object; or
semantic data of the physical object.

20. The information processing apparatus according to claim 18, wherein
the first representation information quantity includes at least one of:
a granularity of first point cloud data of the physical object,
a resolution of first video image data of the physical object, and
an encoding format of the acquired first attribute information of the physical object; and
the second representation information quantity includes at least one of:
a granularity of second point cloud data of the physical object, a resolution of second video image data of the physical object, and an encoding format of the acquired second attribute information of the physical object.

* * * * *